Nov. 6, 1951  H. E. ROSE  2,574,416
VULNERABILITY VALVE
Filed April 24, 1943
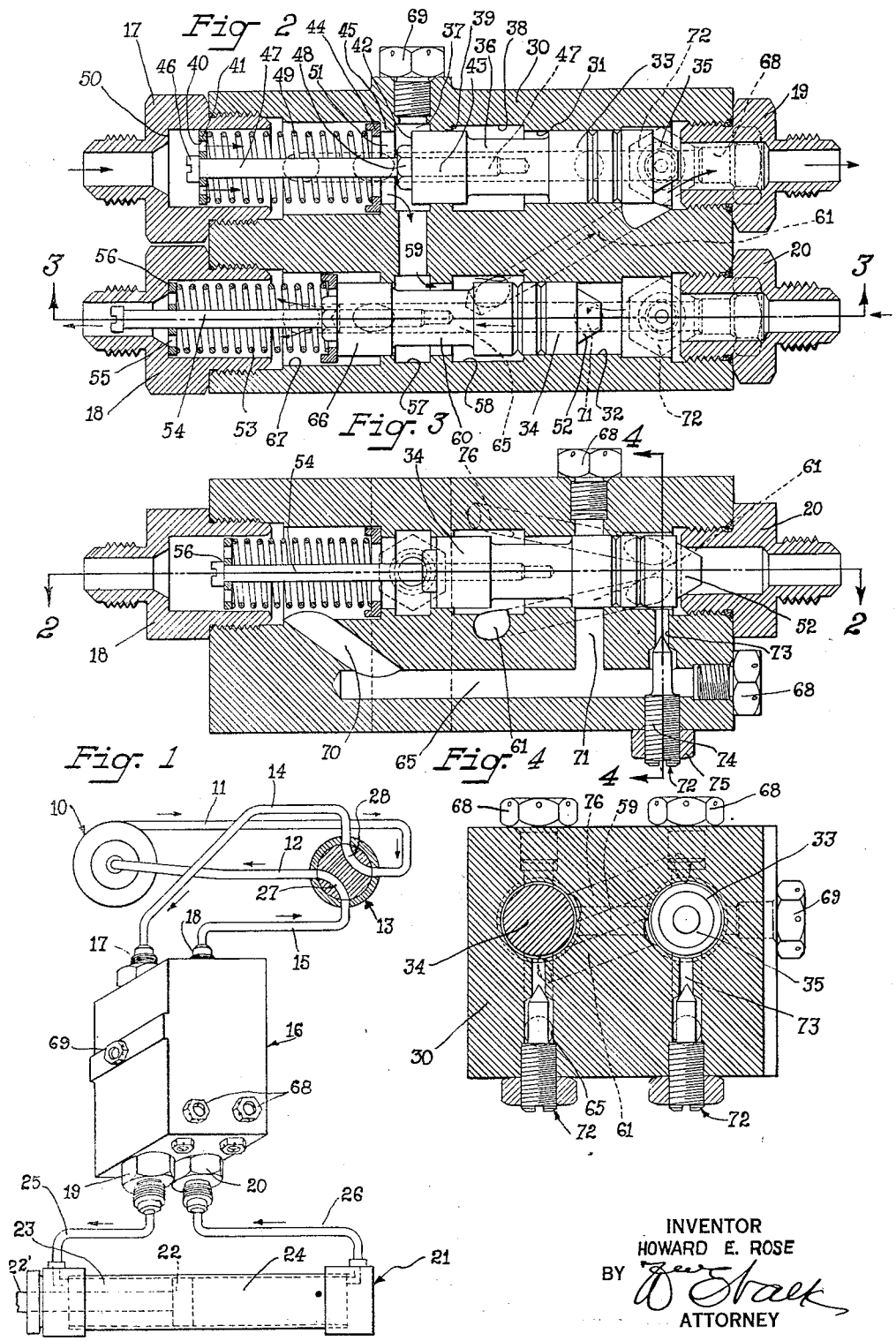
INVENTOR
HOWARD E. ROSE
BY
ATTORNEY Patented Nov. 6, 1951

2,574,416

UNITED STATES PATENT OFFICE 2,574,416

VULNERABILITY VALVE

Howard E. Rose, Normandy, Mo., assignor to Curtiss-Wright Corporation, a corporation of Delaware Application April 24, 1943, Serial No. 484,453

14 Claims. (Cl. 137—153)

This invention relates to fluid safety valves and more particularly to a type of safety or vulnerability valve for use on military planes to effect sealing of a hydraulic system in the event of rupture of the same by gun fire, or for any other reason.

With the hydraulic arrangements in use on airplanes, no provision is made for segregating the ruptured part of the hydraulic system and consequently, upon the same being ruptured or shot off by gun fire, the fluid or oil from the main reservoir is lost or dependent upon the quick action of the pilot to manually turn off the valve before the system becomes useless due to dissipation of the fluid therein.

It is the object of this invention to provide an automatic valve arrangement adapted to be disposed in the hydraulic system which will permit normal line flow of fluid without prematurely effecting the closing off of the hydraulic actuator, i. e., the fluid motor or other device which is operated hydraulically, and yet automatically sensitive to a rupture of the hydraulic actuator or to the lines connected therewith for automatically segregating the actuator from the main reservoir or pressure source.

It is another object of the invention to provide a safety or vulnerability valve which is adaptable for reversible flow systems wherein there are separate lines connected with the hydraulic actuator, which respectively serve as either supply or return lines.

It is another object of the present invention to provide a vulnerability valve which is responsive for its actuation to the building up of fluid pressure in the return lines, the pressure flow through the valve being conditioned upon a prior actuation of a return pressure operated valve element.

According to the present invention, there has been provided a reversible valve adapted for use in a hydraulic system having separate fluid supply and return lines. This valve has two openings therethrough in which control valve elements are respectively disposed. Each of these valves is of the poppet type adapted to positively close off the supply line to the hydraulic actuator upon pressure in the return line from the actuator being depleted. Each valve element completely closes the opening in which it is disposed whereby movement of fluid through the valve housing is necessarily bypassed about the valve elements. Incoming fluid acts upon one valve to open a cross connection between the two main openings and to effect movement of the fluid column in the supply line to the actuator. As this column is moved, fluid is forced from the hydraulic actuator into the return pressure line to thereby cause reverse movement of the valve element in the other main opening. At this latter element and by virtue of a restriction formed in a valve element, fluid in the cross connection is received in a portion of the second main opening and delivered through a diagonal passage to a location in the main opening containing the first valve element but ahead of the same so that a constant supply of fluid will be delivered through the supply line to the hydraulic actuator. The fluid being returned, is bypassed about the second valve element and delivered back to the main reservoir. The valve elements and passages associated with each of the main openings are of similar construction and so arranged that reversal of flow through the valve may be had. The direction of flow of the fluid through the valve is predetermined by the setting of a four-way valve disposed in the system between the fluid pressure source and the vulnerability valve. As the four-way valve is moved to one side or the other of a neutral position, the direction of flow of the fluid through the vulnerability valve is determined.

For other objects and for a better understanding of the invention, reference may be had to the following detailed description taken in connection with the accompanying drawing, in which Fig. 1 is a more or less diagrammatic view of a hydraulic system incorporating the vulnerability valve of the present invention.

Fig. 2 is an enlarged cross sectional view of the vulnerability valve showing the two valve elements positioned for a flow of fluid through the valve, this view taken substantially along the line 2—2 of Fig. 3.

Fig. 3 is a cross sectional view of the valve showing the supply valve element moved to its closed position, as effected upon shut off of fluid flow through the valve due to rupture of the hydraulic system, the view being taken along the line 3—3 of Fig. 2.

Fig. 4 is a cross-sectional view through the valve elements and at the location of the priming means, such as along the line 4—4 of Fig. 3.

Referring now particularly to Fig. 1, there is shown the hydraulic system incorporating the valve of the present invention in which there is a fluid pressure source 10 with an output line 11 and a receiving line 12. These lines 11 and 12 are connected with a four-way valve 13 from which there is extended lines 14 and 15 which are in turn connected to a vulnerability valve 16 at fittings 17 and 18 thereof respectively. From the valve 16 extend fittings 19 and 20 through the former of which with the setting of the four-way valve 13 as shown, there is delivered fluid under pressure to a double acting fluid actuator 21. This fluid actuator has within it a slidable piston element 22 which divides the actuator to provide work sides 23 and 24. A piston rod 22' is adapted to connect with some movable part of an aircraft to move the part with respect to the body thereof. With fluid being delivered from the fitting 19 to the work side 23 of the fluid actuator through a pipe line 25, the piston 22 is urged to the right and will force fluid through a return line 26 from the other side 24 of the actuator for delivery through the fitting 20 to the valve 16, fitting 18, line 15, through a port 27 in the four-way valve 13 and thence through line 12 to the fluid pressure source 10.

When it is desired to move the piston 22 to the left, the four-way valve 13 is rotated through a neutral position to a position whereby the port 27 therein is aligned with lines 11 and 15. When this is done, the flow of fluid through the system is reversed. Fluid will leave the work side 23, be delivered to the fitting 19 of the vulnerability valve 16, out of the fitting 17 to pipe line 14, through a port 28 which is then positioned for connection to the return line 12, to the pressure source 10.

Referring now more particularly to the other figures, it will be seen that the valve 13 includes a housing 30 having openings 31 and 32 extending therethrough. In these openings there is respectively located poppet valve elements 33 and 34 slidable to the right to engage respectively fittings 19 and 20 to effect positive shut off of fluid to lines 25 and 26 connected with the fluid actuator 21.

With the valve elements 33 and 34 positioned as shown in Fig. 2, a flow of fluid is permitted through the valve for delivery through the fitting 19 to the fluid actuator 21 and the return of fluid from the actuator 21 through fitting 20 and out of fitting 18 for return to the fluid pressure source.

The valve elements 33 and 34 are of identical construction and for the present, the element 33 will be described. It includes a head 35 and a narrowed or constricted portion 36 adapted to be aligned in one position of the valve element with enlarged chambers 37 and 38 of opening 31. These chambers 37 and 38 are spaced from one another by a wall portion 39. Fluid entering the valve 16 passes through fitting 17, through openings 40, in a washer 41 and acts directly upon a rear face 42 of a cylindrical portion 43 of the valve element 33.

With the four-way valve 13 turned to a neutral position, the valve element 33 is returned so that the rear face 42 is flush against a washer 44 which is normally seated against a shoulder 45 formed in the wall of the opening 31. The washer 41 is restrained against rearward movement by a head 46 of an elongated screw 47 threaded into the valve element 33 and locked therein by a lock nut 48. Between the two washers 41 and 44, there is disposed a spring 49 adapted to normally maintain the washer 41 against a shoulder 50 of the fitting 17. With the washer 41 so disposed, the rear face 42 is moved to a position against the washer 44 and such as to close off the chamber 37 from an opening portion 51 within the shoulder 45.

Pressure having been supplied through the fitting 17 and through the openings 40 in washer 41, and against the rear face 42, the valve element 33 will have been positioned so as to assume the position as shown in Fig. 2 and such as to permit the flow of fluid through the opening 51 to the chamber 37. Assuming that there has been provided a solid column of fluid extending from the head 35 of the valve element 33, through the fitting 19, pipe line 25, and work side 23 of the hydraulic actuator 21, the same will have been moved along by the actuation of the valve 33 to the position shown in Fig. 2, the amount of movement having been predetermined by the amount of fluid required to open valve 34. Sufficient valve travel is usually left available to compensate for the difference in volume of the two sides of the fluid actuator plus some air in the lines. With a similar solid column of fluid being provided on the opposite work side 24 of the piston 22, a similar displacement of this fluid would have taken place in the return line 26 and fitting 20 to act against a head 52 of the valve 34 to thereby move the valve 34 to the position as shown in Fig. 2. It will be noted that this valve has been moved in a reverse direction from that which the valve 33 was moved. A spring 53 for this valve will have been compressed as shown and a screw 54 thereof will have been projected further into the fitting 18, a washer 55 having been retained against a shoulder 56 of the fitting 18.

The opening 32 is also provided with enlarged chambers 57 and 58. The chamber 57 is connected with the chamber 37 of the opening 31 by a cross passage 59 and a narrowed or restricted portion 60 of the valve 34 having been registered with the enlarged chambers 57 and 58, flow of fluid takes place between the enlarged chambers 57 and 58. Leading from the enlarged chamber 58 is a diagonal passage 61 adapted to deliver fluid from the chamber 58 to a location in the opening 31 near the fitting 19 so that when the valve 33 is in a position, as shown in Fig. 2, fluid is delivered to the fitting 19. It should thus be apparent that there has been provided a bypass means for the passage of fluid under pressure being delivered to the fitting of the valve 16 about the valve element 33, for delivery through fitting 19 and to the work side 23 of the fluid actuator 21.

It should now be apparent that this flow through the bypass is conditioned upon prior positioning of the valve element 34 which is responsive to return fluid pressure from the hydraulic actuator. Should either column of fluid extending from the fittings 19 and 20 be ruptured, this positioning of the valve elements 33 and 34 to effect the bypass of the fluid about the valve element 33, would have been impossible.

Associated with each of the openings through the valve, is a second bypass 65 which is adapted to receive return fluid when the valve element 34 is positioned as shown in Fig. 2, for delivery of the same rearwardly of its cylinder portion 66 to an opening 67, past spring 53, through openings 55 of a washer 56, and out of the fitting 18, it being noted that the entrance to the bypass 65, which is associated with the opening in which the valve element 33 is accommodated, is closed by the said element as the latter is advanced to open the cross passage 59. These bypasses 65 are constructed by the drilling of openings through the housing 30 and finally closing these openings at the outside points by means of closing screws 68. The cross connection 59 is drilled from the outside of the housing 30 through the chamber 37 and is closed by a closing screw 69. Holes 70 thereof are drilled from the chamber which contains the compression spring and at an angle therewith.

Assuming that one of the lines 25 and 26 of the actuator 21 is ruptured, the condition in the valve will have changed. The valve element 34 will have moved forwardly to close off the cross connection 59 whereby fluid pressure will build up against the rear face 42 to finally move the valve element 33 to the right, past the opening 61, so that its head 35 will engage the fitting 19, thereby positively cutting off the supply of fluid to the fitting 19. The valve 34 will have accordingly moved forward to such a position as to close off the chambers 57 and 58 and as well, the bypass means 65 at entrance 71 thereof. This valve 34 however, will not be moved all the way home to have its head 52 engage with the fitting 20, but it will assume a position with its portion 42 against washer 44 which will shoulder against shoulder 45 of the opening 31.

As is clearly shown in Figures 2 and 3, the enlargement of valve 34 adjacent head 52 is so related to the cylindrical portion 66 that the supply and return passages through the valve body are opened in sequence. Returning fluid entering through fitting 20 will shift valve 34 first to open the by-passage 59, 61 around piston-valve 33, and then to uncover port 71 to open the by-passage 71, 65, 70. By this sequential operation the by-passage 59, 61 is positively maintained open so long as there is pressure in return line 26 sufficient to hold valve 34 in a position opening by-passage 59, 61 against the bias of spring 53 which constantly urges closing movement of the valve.

In order to initially prime the arrangement so as to provide the solid columns of fluid, there is provided priming means 72 associated with the bypass means 65. Fluid will be taken from the location rearwardly of the valve element and be delivered through a needle valve opening 73 to a location ahead of the valve element 33 as it is in its normal position. The needle opening 73 is controlled by a needle valve element 74 adapted to be locked in its closed position by a locking nut 75.

It should be noted in Figs. 3 and 4 that there are shown two openings extending diagonally through the housing to a location ahead of the valve element in the other opening. Such other diagonally extending passage is shown at 76. This other diagonal passage comes into use when the operation of the valve is reversed and when fluid is received under pressure through fitting 18 instead of through the fitting 17.

It should now be apparent that there is provided with each main opening 31 and 32, a similar arrangement of bypass passages so that the valve arrangement can operate as well in a reverse manner as in a manner just described.

It should now be apparent that there has been provided a vulnerability valve adapted for use in a hydraulic system having separate fluid supply and return lines, which will permit normal flow of fluid therethrough without being actuated to a closed position and one which is dependent upon a return fluid pressure in order that the valve be conditioned for the normal flow of fluid through the same.

It should also be apparent that there has been provided in such a valve, an arrangement whereby, upon failure of the return fluid pressure, the supply line to the fluid actuator is automatically and positively shut off and further that there has been provided a valve which is reversible in its operation.

While various changes may be made in the detailed construction, it shall be understood that such changes shall be made without departing from the spirit and scope of the present invention, as defined by the appended claims.

I claim as my invention:

1. An automatic valve device for a fluid system having reversible supply and return passages, comprising a movable fluid separating wall in each passage, each wall being movable in one direction at the initiation of supply flow through its passage to displace fluid downstream thereof and being movable in the opposite direction at the initiation of return flow through its passage, a supply by-passage and a return by-passage around each wall, valve means operable by each wall for controlling its return by-passage and for controlling the supply by-passage around the other wall, each of said valve means being operated, to open both by-passages controlled thereby, upon movement of the operating wall thereof in said opposite direction, and other valve means operable by each wall for controlling supply flow through its passage, each of said other valve means being operated to close its passage upon abnormal movement of its wall in said one direction resulting from failure of the supply by-passage around its wall to open.

2. An automatic valve device for a fluid system having reversible supply and return passages, comprising a movable fluid separating wall in each passage, each wall being movable in one direction at the initiation of supply flow through its passage to displace fluid downstream thereof and being movable in the opposite direction at the initiation of return flow through its passage, a supply by-passage and a return by-passage around each wall, a first valve operable by each wall for controlling its return by-passage, a second valve operable by each wall for controlling the supply by-passage around the other wall, each first and second valve being operated, to open the by-passage controlled thereby, upon movement of its operating wall in said opposite direction, and a third valve operable by each wall for controlling supply flow through its passage, each third valve being operated to close its passage upon abnormal movement of its wall in said one direction resulting from failure of the supply by-passage around its wall to open.

3. An automatic valve device for a fluid system having reversible supply and return passages, comprising a piston in each passage, each piston being movable in one direction at the initiation of supply flow through its passage to displace fluid downstream thereof and being movable in the opposite direction at the initiation of return flow through its passage, a supply by-passage and a return by-passage around each piston, slide valve means provided on and operable by each piston for controlling its return by-passage and for controlling the supply by-passage around the other piston, the slide valve means of each piston being operated to open both by-passages controlled thereby upon movement of the piston in said opposite direction, and each piston having a poppet valve for controlling supply flow through its passage, each poppet valve being operated to close its passage upon abnormal movement of its piston in said one direction resulting from failure of the supply by-passage around its piston to open.

4. An automatic valve device for a fluid system having reversible supply and return passages, comprising a movable fluid separating wall in each passage, each wall being movable in one direction from a neutral position at the initiation of supply flow through its passage to displace fluid downstream thereof and being movable in the opposite direction from its neutral position at the initiation of return flow through its passage, a supply by-passage and a return by-passage around each wall, valve means operable by each wall for controlling its return by-passage and for controlling the supply by-passage around the other wall, each of said valve means being operated, to open both by-passages controlled thereby, upon movement of the operating wall thereof in said opposite direction, other valve means operable by each wall for controlling supply flow through its passage, each of said other valve means being operated to close its passage upon abnormal movement of its wall in said one direction resulting from failure of the supply by-passage around its wall to open, and means for biasing each wall toward its neutral position.

5. An automatic valve device for a fluid system having reversible supply and return passages, comprising a movable fluid separating wall in each passage, each wall being movable in one direction from a neutral position at the initiation of supply flow through its passage to displace fluid downstream thereof and being movable in the opposite direction from its neutral position at the initiation of return flow through its passage, a supply by-passage and a return by-passage around each wall, a first valve operable by each wall for controlling its return by-passage, a second valve operable by each wall for controlling the supply by-passage around the other wall, each first and second valve being operated, to open the by-passage controlled thereby, upon movement of its operating wall in said opposite direction, a third valve operable by each wall for controlling supply flow through its passage, each third valve being operated to close its passage upon abnormal movement of its wall in said one direction resulting from failure of the supply by-passage around its wall to open, and means for biasing each wall toward its neutral position.

6. An automatic valve device for a fluid system having reversible supply and return passages, comprising a piston in each passage, each piston being movable in one direction from a neutral position at the initiation of supply flow through its passage to displace fluid downstream thereof and being movable in the opposite direction from its neutral position at the initiation of return flow through its passage, a supply by-passage and a return by-passage around each piston, slide valve means provided on and operable by each piston for controlling its return by-passage and for controlling the supply by-passage around the other piston, the slide valve means of each piston being operated to open both by-passages controlled thereby upon movement of the piston in said opposite direction each piston having a poppet valve for controlling supply flow through its passage, each poppet valve being operated to close its passage upon abnormal movement of its piston in said one direction resulting from failure of the supply by-passage around its piston to open, and means for biasing each piston toward its neutral position.

7. An automatic valve device for a fluid system having reversible supply and return passages, comprising a movable fluid separating member in each passage, each member being movable in one direction at the initiation of supply flow through its passage to displace fluid downstream thereof and being movable in the opposite direction the initiation of return flow through its passage, a supply by-passage and a return by-passage around each member, and valve means operable by each member for controlling its return by-passage and for controlling the supply by-passage around the other member, each of said valve means being operated, to open both by-passages controlled thereby, upon movement of the operating member thereof in said opposite direction.

8. An automatic valve device for a fluid system having reversible supply and return passages, comprising a movable fluid separating member in each passage, each member being movable in one direction at the initiation of supply flow through its passage to displace fluid downstream thereof and being movable in the opposite direction at the initiation of return flow through its passage, a supply by-passage and a return by-passage around each member, a first valve operable by each member for controlling its return by-passage, and a second valve operable by each member for controlling the supply by-passage around the other member, each of said valves being operated, to open the by-passage controlled thereby, upon movement of the operating member thereof in said opposite direction.

9. An automatic valve device for a fluid system having reversible supply and return passages, comprising a movable fluid separating wall in each passage, each wall being movable in one direction from a neutral position at the initiation of supply flow through its passage to displace fluid downstream thereof and being movable in the opposite direction from its neutral position at the initiation of return flow through its passage, a supply by-passage and a return by-passage around each wall, valve means operable by each wall for controlling its return by-passage and for controlling the supply by-passage around the other wall, each of said valve means being operated, to open both by-passages controlled thereby, upon movement of the operating wall thereof in said opposite direction, and means for biasing each wall toward its neutral position.

10. An automatic valve device for a fluid system having reversible supply and return passages, comprising a movable fluid separating wall in each passage, each wall being movable in one direction from a neutral position at the initiation of supply flow through its passage to displace fluid downstream thereof and being movable in the opposite direction from its neutral position at the initiation of return flow through its passage, a supply by-passage and a return by-passage around each wall, a first valve operable by each wall for controlling its return by-passage, a second valve operable by each wall for controlling the supply by-passage around the other wall, each of said valves being operated, to open the by-passage controlled thereby, upon movement of the operating wall thereof in said opposite direction, and means for biasing each wall toward its neutral position.

11. An automatic valve device for a fluid system having reversible supply and return passages, comprising a movable fluid separating member in each passage, each member being movable in one direction at the initiation of supply flow through its passage to displace fluid downstream thereof and being movable in the opposite direction at the initiation of return flow through its passage, a by-passage around each member, a valve operable by each member for controlling the by-passage around the other member, each valve being operated, to open the by-passage controlled thereby, upon movement of the operating member thereof in said opposite direction, and means for by-passing return flow past each member subsequent to such movement thereof in said opposite direction.

12. An automatic valve device for a fluid system having reversible supply and return passages, comprising a movable fluid separating member in each passage, each member being movable in one direction from a neutral position at the initiation of supply flow through its passage to displace fluid downstream thereof and being movable in the opposite direction from its neutral position at the initiation of return flow through its passage, a by-passage around each member, a valve operable by each member for controlling the by-passage around the other member, each valve being operated, to open the by-passage controlled thereby, upon movement of the operating member thereof in said opposite direction from its neutral position, means for by-passing return flow past each member subsequent to such movement thereof in said opposite direction, and means for biasing each member toward its neutral position.

13. An automatic valve device for a fluid system having reversible supply and return passages, comprising a movable fluid separating member in each passage, each member being movable in one direction at the initiation of supply flow through its passage to displace fluid downstream thereof and being movable in the opposite direction at the initiation of return flow through its passage, a by-passage around each member, and a valve operable by each member for controlling the by-passage around the other member, each valve being operated, to open the by-passage controlled thereby, upon movement of the operating member thereof in said opposite direction.

14. An automatic valve device for a fluid system having reversible supply and return passages, comprising a movable fluid separating member in each passage, each member being movable in one direction from a neutral position at the initiation of supply flow through its passage to displace fluid downstream thereof and being movable in the opposite direction from its neutral position at the initiation of return flow through its passage, a by-passage around each member, a valve operable by each member for controlling the by-passage around the other member, each valve being operated, to open the by-passage controlled thereby, upon movement of the operating member thereof in said opposite direction from its neutral position, and means for biasing each member toward its neutral position.

HOWARD E. ROSE.

REFERENCES CITED

The following references are of record in the file of this patent:

UNITED STATES PATENTS

| Number | Name | Date |
| --- | --- | --- |
| 1,775,856 | Hauser | Sept. 16, 1930 |
| 2,027,706 | Schauer | Jan. 14, 1936 |
| 2,193,736 | Onions | Mar. 12, 1940 |
| 2,205,046 | Nardone | June 18, 1940 |
| 2,307,949 | Phillips | Jan. 12, 1943 |
| 2,428,150 | Field | Sept. 30, 1947 |
| 2,478,210 | Sprague | Aug. 9, 1949 |